April 19, 1966 R. J. FURLONG 3,247,492

AUTOMATIC MEMORY START CIRCUIT FOR ASYNCHRONOUS DATA PROCESSING SYSTEM

Filed Dec. 31, 1962 3 Sheets-Sheet 1

Inventor

R. J. FURLONG

By Hughes, Rothwell, Mion and Zinn

Attorneys

April 19, 1966 R. J. FURLONG 3,247,492

AUTOMATIC MEMORY START CIRCUIT FOR ASYNCHRONOUS DATA PROCESSING SYSTEM

Filed Dec. 31, 1962 3 Sheets-Sheet 3

United States Patent Office 3,247,492
Patented Apr. 19, 1966

3,247,492

AUTOMATIC MEMORY START CIRCUIT FOR ASYNCHRONOUS DATA PROCESSING SYSTEM

Robert J. Furlong, Poughkeepsie, N.Y., assignor to International Business Machines Corporation, New York, N.Y., a corporation of New York Filed Dec. 31, 1962, Ser. No. 248,776
4 Claims. (Cl. 340—172.5)

This invention relates broadly to an automatic starting circuit for the memory of an asynchronous data processing system and, more particularly, to a delay line memory clock and associated logic circuits which automatically start the clock before the end of a current cycle when there is a waiting demand for use of the memory in the following cycle.

In asynchronous data processing systems of the prior art, so-called set-up time for addressing the memory before each memory cycle resulted in an undesirable delay between memory cycyles. In a copending application by R. J. Furlong for "Asynchronous Data Processing System," Serial No. 248,750 assigned to the same assignee as the present application, there is described an asynchronous byte buffer which operates on random read-only and write-only cycles with destructive read out, thereby permitting the buffer to operate twice as rapidly as normal regenerative memories which require one half of each timing cycle for regeneration. This one half cycle in such prior art systems is lost even when read-only and write-only cycles are used. However, in the system embodying the present invention, the buffer or memory utilizes both half cycles of the normal timing cycle for read-only and write-only operations in a random fashion.

There is described in said co-pending application a read/write controls circuit which generates a feedback pulse near the end of each memory cycle to sense a pending request for use of the buffer in the next cycle. When such a request is sensed, the memory address controls for the next cycle are gated by the feedback pulse so that no lost time occurs between successive cycles. This application discloses and claims in detail the read/write controls circuit used in the asynchronous data processing system disclosed in said pending application.

Therefore, the principal object of this invention is to provide a data processing system with an asynchronous memory clock which generates a feedback pulse to start the clock whenever there is an awaiting request for use of the memory.

Another object of this invention is to provide an asynchronous data processing system with individual read and write memory clocks which will generate feedback pulses to start the clocks whenever the feedback pulse occurs concurrently with a demand for use of the memory in the next memory cycle.

A further object of this invention is to provide a data processing system with individual read-only and write-only delay line memory clocks which permit read-only and write-only operations to occur randomly on successive half cycles of the normal timing cycle.

A more specific object of this invention is to provide an asynchronous data processing system with an asynchronous delay line clock which generates a feedback pulse before the end of a current cycle for setting up memory address controls for the following memory cycle before the current memory cycle has terminated.

Briefly, in the attainment of the foregoing objects, there is provided a data processing system which includes a read-only delay line memory clock and a write-only delay line memory clock. A clock may be started initially by a suitable memory request signal externally generated. However, once a clock has been started, and there are successive demands for use of the memory in following cycles, the memory clock is automatically started by means of a feedback pulse derived from a delay line memory before the end of each cycle. This feedback pulse is applied to suitable logic circuits which gate the appropriate addresses for the next cycle operation into the memory address register and also applies a start pulse to the delay line memory clock to provide the necessary memory pulses for operation of the following cycle.

Other objects and features of the invention will be pointed out in the following description and claims and illustrated in the accompanying drawings which disclose by way of example the principle of the invention and the best mode which has been contemplated of applying that principle.

Figure 1:
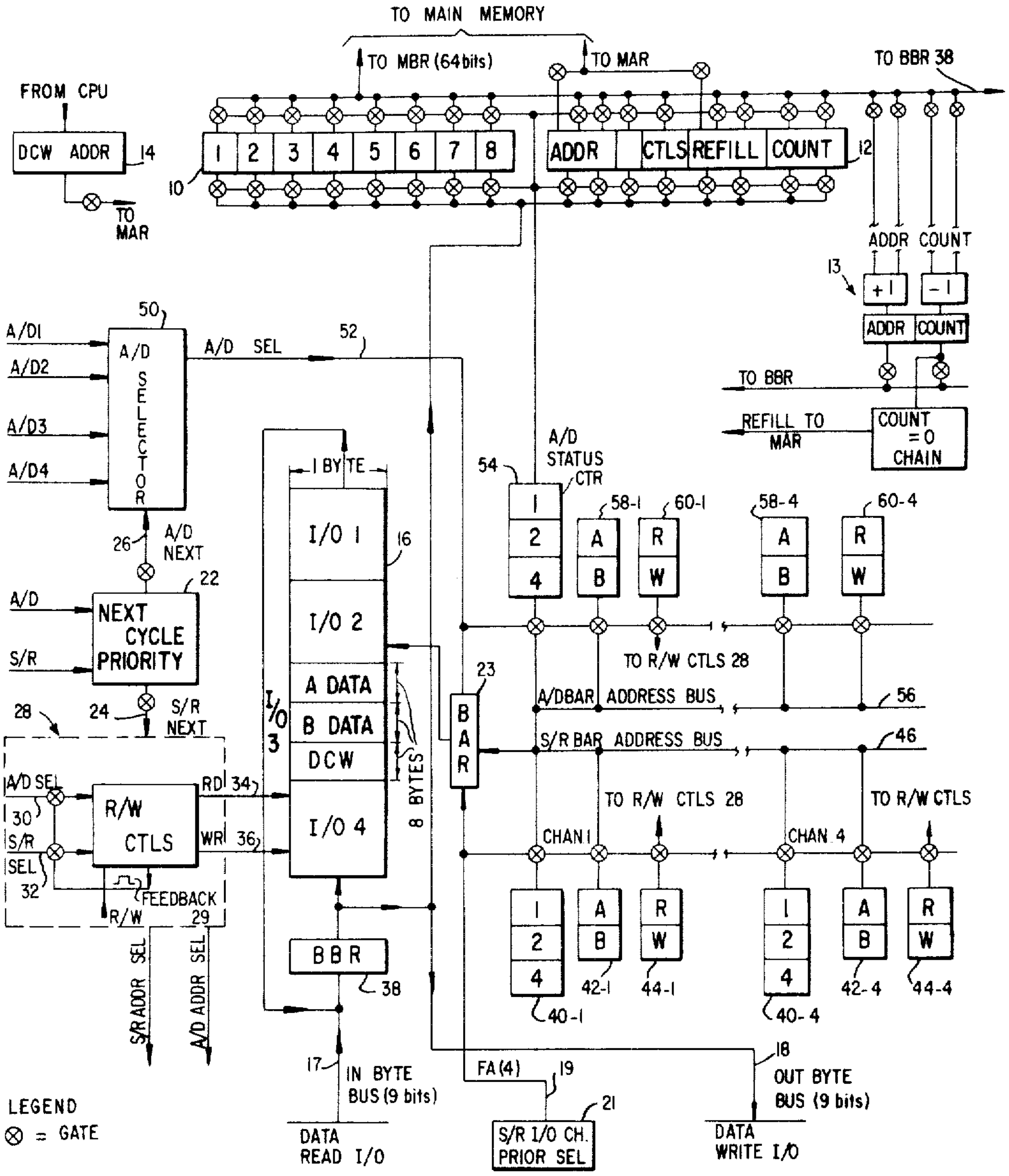
FIGURE 1 is a block diagram showing the data flow path, necessary controls and general organization of an asynchronous data processing system embodying this invention.

FIGURE 1 is a block diagram of the asynchronous data processing system disclosed in said pending application which is expressly incorporated by reference into this application. Briefly, this system provides broadly for the asynchronous transmission of data between a plurality of simultaneously operating input-output devices and the main memory of a central processing unit. A word register 10 stores computer words which are eight bytes long for transferral between a byte buffer 16 and the main memory. A data control word register 12 stores the control word which keeps track of the address of the computer word and exercises other controls. The control circuits 13 modify the address and count fields of the data control register in accordance with the data flow between main memory and byte buffer 16.

For the case illustrated, buffer 16 services four input-output channels. Data bytes read from the channels are transmitted on bus 17 through a byte buffer register 38 to a buffer section associated with the chosen channel. Data transferred from buffer 16 to the I/O channels passes through BBR 38 to out byte bus 18. The particular channel to be serviced is determined by an S/R I/O priority select circuit 21.

Each buffer section contains three word portions: an A data portion, a B data portion, and a data control word (DCW) portion. Each portion has eight levels, each containing one byte.

A request for transferral of data bytes between the buffer 16 and the I/O channels has priority over a request for transfer of data words between buffer 16 and the main memory. The operation between byte buffer 16 and main memory is referred to as an assembly-disassembly operation (A/D). When a data portion of buffer 16 has been filled with data bytes from one of the I/O channels an A/D signal is automatically generated to indicate that the buffer holds data for transferral to the main memory. The main memory may also generate a signal to indicate that it desires to send data to the byte buffer. In either case, an A/D signal is generated and applied to the input of a next cycle priority circuit 22. If an I/O channel desires service from the buffer, an S/R signal is applied to the next cycle priority circuit. An A/D selector assigns priority to one of the A/D requests and gates the address of the selected buffer section into the buffer address register BAR 23 if there is no S/R request pending.

Data is then transferred between word register 10 and buffer 16 under the control of an A/D status counter 54 and an A/B trigger 58 which function to address the proper portion and levels of the selected buffer section. There is one A/D status counter to supervise all A/D operations and a separate A/B trigger for each buffer section. Each buffer section also has assigned to it an R/W trigger 60 which is set externally by CPU to determine a read-only or write-only buffer cycle, i.e., whether data is being transferred from buffer 16 to register 10 or from register 10 to buffer 16.

The transfer of data bytes between the buffer 16 and the I/O channels is controlled by individual byte status counters 40, A/B triggers 42 and read/write triggers 44. Counters 40 and triggers A/B form part of the address of the selected channel buffer section and the R/W triggers determine the direction of flow of data bytes between buffer 16 and the I/O channels.

The R/W controls 28 include delay line memory clock means for generating read clock pulses (RD) on line 34 and write clock pulses (WR) on line 36. RD or WR pulses are determined by the condition of the R/W trigger associated with the particular channel section being processed. R/W CTLS 28 also produces the feedback pulse 29 which enables the gating of address controls for the following cycle prior to the end of the current cycle and also starts the delay line memory clock means for controlling the following cycle. It is R/W CTLS which is the subject matter of the present invention.

Figure 2:
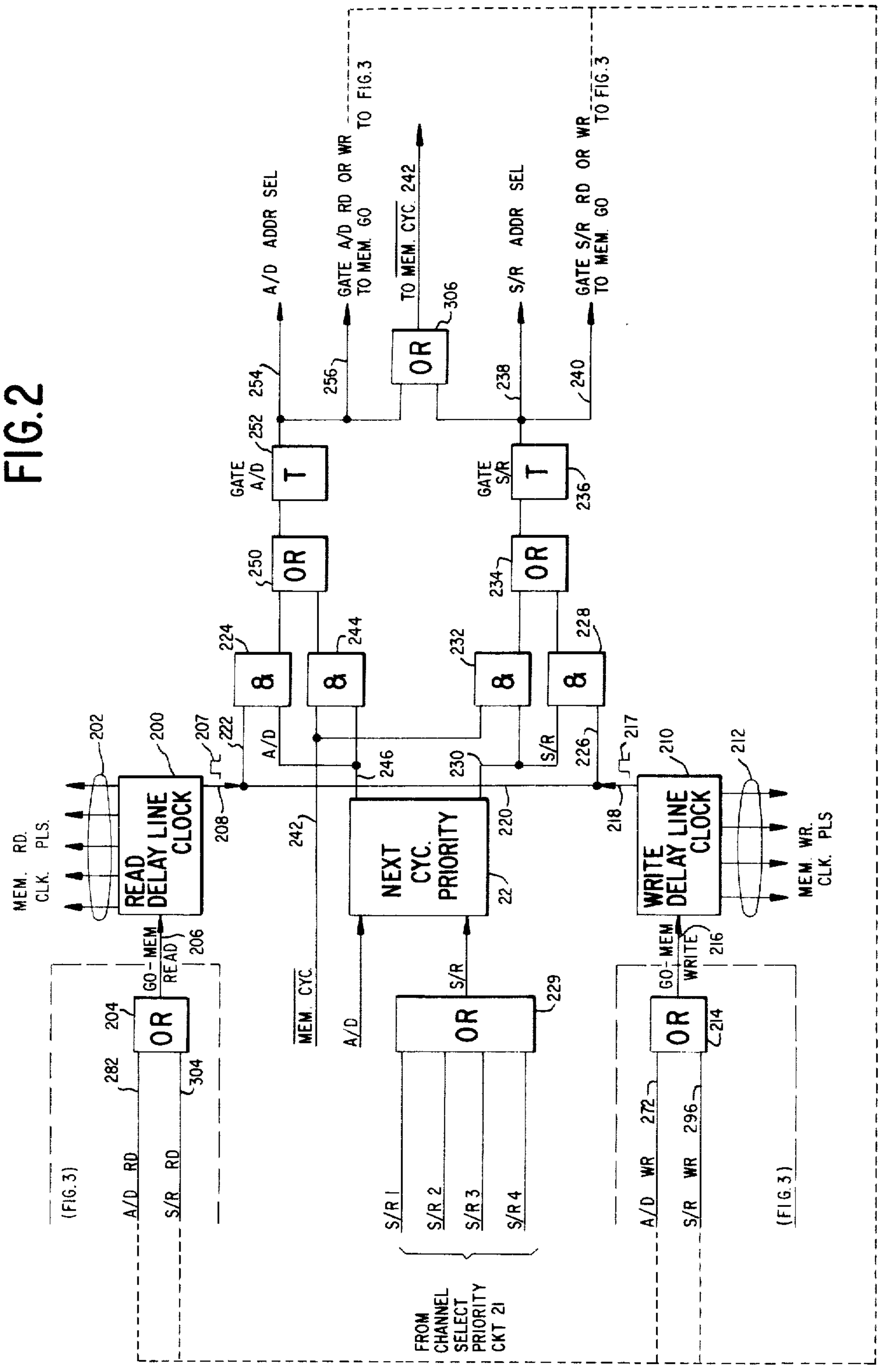
FIGURE 2 shows the delay line memory clocks and associated logic circuits for generating the feedback pulse and FIGURE 3 shows the logic circuits in which the feedback pulse is combined with other signals in the system to provide automatic starting of the clocks and gating of memory address controls.
Figure 3:
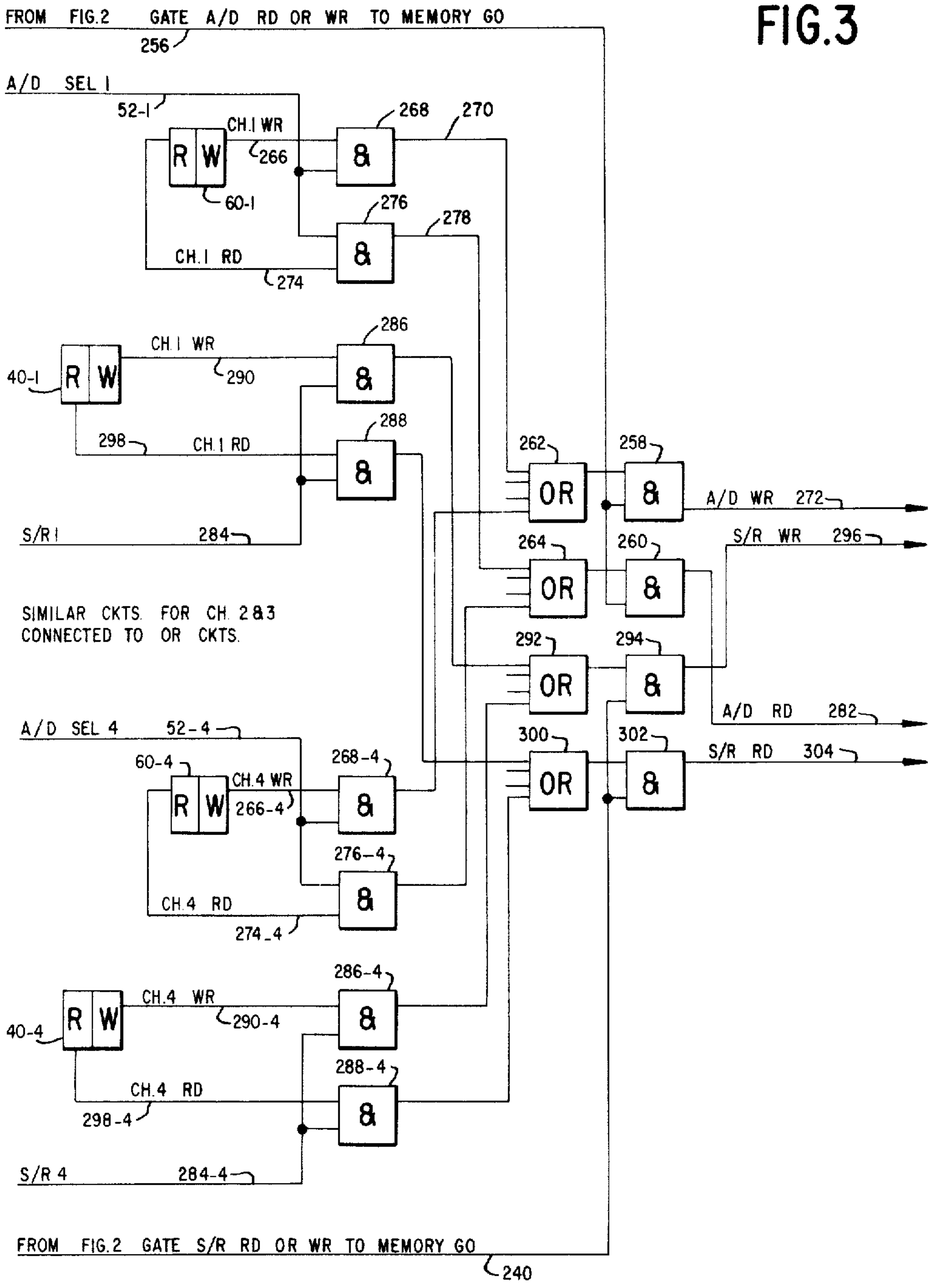

The details of R/W CTLS 28 are shown in FIGURES 2 and 3. A read delay line memory clock 200 is provided with a plurality of output lines 202 which are tapped off along the length of the delay line to provide memory read clock pulses to operate the byte buffer memory shown in FIGURE 1 in a read-only cycle. An OR circuit 204 provides a start pulse entitled GO-MEM-READ to the input line 206 of read delay line clock 200. A feedback pulse 207 is produced on a line 208 which is tapped off the delay line clock 200 at a predetermined distance from the end thereof. This distance is determined by the time required for the pulse to ripple through the logic circuits for triggers to switch, for counters to settle down, etc., so that a start pulse may be applied to the memory clock at the end of the current memory cycle.

A separate write delay line clock 210 is also provided with a plurality of output lines 212 tapped off the delay line at various distances along the length thereof to provide memory write clock pulses spaced in time to operate the byte buffer memory shown in FIGURE 1 in a write-only cycle. Delay line clock 210 is started by means of an output pulse from OR circuit 214 which is applied to the input line 216 of the delay line clock 210. The delay line clock 210 also provides a feedback pulse 217 on a line 218 which is tapped off the delay line at the predetermined distance from the end thereof.

Both feedback pulses 207 and 217 are generated before the end of the current memory cycle being controlled by either the memory read clock pulses or the memory write clock pulses. These feedback pulses are applied to a common conductor 220. Furthermore, the pulse 207 is applied to the input line 222 of an AND gate 224 and feedback pulse 217 is applied to the input line 226 of an AND gate 228.

In FIGURE 2 there is also reproduced the next cycle priority circuit 22 shown in FIGURE 1. The individual S/R1, S/R2, S/R3 and S/R4 channel service request signals may be applied to an OR circuit 229 to produce an S/R or channel service request signal which is applied to the input of circuit 22. A signal then appears on output line 230 which in turn is connected to an input of AND gate 232 and to an input of AND gate 228. Both of these AND gates are connected to an OR circuit 234 whose output sets a trigger 236. The other input of AND gate 228 is line 226 which carries the feedback pulses from clocks 200 and 210.

Consequently, when there is a coincidence of an S/R signal and feedback pulse 207 or 217, an output appears from gate 228 and is transmitted through OR gate 234 to set trigger 236. An output from trigger 236 is applied to a pair of parallel conductors 238 and 240. The signal on line 238 is S/R ADDR SEL which signal is shown in FIGURE 1 as an output of R/W CTLS 28. The output signal on line 240 is referenced as GATE S/R RD or WR TO MEM GO.

When it is desired to initiate a byte buffer memory cycle when another cycle is not already in progress, an alternate set of AND gates 232 and 244, respectively, are employed since no feedback pulse is pending due to the inactivity of the byte buffer. The conditioning legs on AND circuits 232 and 244 called $\overline{\text{MEM. CYC.}}$ 242 are generated with the OR circuit 306.

In like manner, when an A/D signal appears on the input of next cycle priority circuit 22 and there is no S/R signal on the input thereof, an A/D signal appears on the output line 246 of circuit 22 which in turn is connected as one input to AND gate 244 and as the other input to AND gate 224. The other input to AND gate 244 is the $\overline{\text{MEM. CYC.}}$ line. Consequently, it can be seen that when there is a coincidence with either $\overline{\text{MEM. CYC.}}$ or feedback pulse 207 or 217 with either an S/R line or an A/D line, one of the AND gates 224 or 244 will generate an output which is passed through an OR circuit 250 to set a trigger 252. When trigger 252 is in a set condition, it provides to output conductors 254 and 256 the respective signals A/D ADDR SEL and GATE A/D RD OR WR TO MEM GO. The A/D ADDR SEL and S/R ADDR SEL signals are then utilized to gate respectively the channel addresses for an A/D operation and the channel addresses for an S/R operation to BAR 23 as described in more detail in said pending application.

Referring now to FIGURE 3, we see that line 256 is connected to one input of each of the AND gates 258 and 260. The other input of AND gate 258 is the output of an OR circuit 262 and the other input to AND gate 260 is the output of an OR circuit 264.

The input to these OR circuits are derived from R/W triggers. Trigger 266 is associated with buffer channel section No. 1 and is equivalent to either R/W trigger 44–1 or R/W trigger 60–1 as shown in FIGURE 1. Actually, trigger 60–1 and 44–1 may in practice be the same circuit. Similar circuits exist for each channel connected.

In any event, when the A data portion of a channel section is being utilized for an S/R operation, the B portion is automatically assigned to be used in an A/D operation. Consequently, the output lines 270 and 273 may be considered complementary since they are derived from opposite sides of R/W trigger 60–1. Similar circuits exist for each channel connected. Assuming that the channel No. 1 section of buffer 16 has been selected for an A/D buffer write operation, R/W trigger 60–1 will be set to its W position and provide an output on line 266 which is connected as one input to AND gate 268. The other input to AND gate 268 is the A/D SEL 1 signal from bus 52 in FIGURE 1. Consequently, a signal will appear on line 270 which is connected as an input to OR gate 262. It can therefore be seen that when there is a coincidence of a feedback pulse and an A/D SEL 1 signal, an A/D WR signal appears on line 272 which is one of the inputs to OR gate 214 in FIGURE 2. The output pulse from OR gate 214 is GO-MEM WRITE which starts write delay line clock 210.

In like manner, when a buffer read operation has been selected for an A/D sequence, trigger 60–1 is in its R position and an output will appear on conductor 274 which is connected as one input to AND gate 276. The other input to AND gate 276 is the A/D SEL 1 signal which will produce a signal on the output line 278 of AND gate 276.

Line 278 is connected as an input to OR gate 264 whose output is connected to one of the inputs of AND gate 260. The other input to AND gate 260 is the signal on line 256. Therefore, an A/D RD signal appears on the output line 282 of AND gate 260 when an A/D buffer read operation is to occur. It will be noted that line 282 is connected to one of the inputs of OR gate 204 in FIGURE 2 to generate a GO MEM READ signal to start read delay line clock 200.

When an S/R signal is generated, it, of course, has priority over an A/D operation. For example, if an S/R 1 signal is generated, it is applied by the conductor 284 to one input of each of the AND gates 286 and 288. If a channel write operation is to take place, R/W trigger 40–1 is set to its W position to generate an output on line 290 which is connected to the other input to AND gate 286 whose output in turn is connected to one of the inputs of an OR circuit 292 whose output in turn is connected to one of the inputs of AND gate 294. The other input to AND gate 294 is the signal appearing on line 240. Consequently, when there is a coincidence of a feedback pulse and an S/R 1 signal, an S/R WR pulse appears on the output line 296 of AND gate 294. It will be noted that this is the other input line to OR gate 214 in FIGURE 2.

In like manner, when there is an S&R 1 read operation requested, trigger 40–1 will be in its R position to provide an output on line 298 which is connected to one of the inputs of AND gate 288. Since the other input to AND gate 288 is line 284 an output pulse from AND gate 288 will then be applied to an OR circuit 300 whose output is applied to one of the inputs of AND gate 302. The other input to AND gate 302 is line 240. Therefore, it can be seen that a S/R RD signal will appear on line 304 when there is a coincidence of a fedeback pulse and an S/R 1 read service request. It will be noted that line 304 is the other input to OR gate 204 which produces a GO MEM READ pulse to start read delay line clock 200.

Identical logic circuits are used for starting the memory clocks for S/R and A/D operations for channels 2, 3 and 4. These circuits are shown for channel 4, and the elements thereof are identified by the same reference numerals used for the channel No. 1 circuits with the addition of "—4" after each reference numeral.

While there have been shown and described and pointed out the fundamental novel features of the invention as applied to a preferred embodiment, it will be understood that various omissions, substitutions, and changes in the form and detail of the system illustrated and in its operation may be made by those skilled in the art without departing from the spirit of the invention. It is the intention, therefore, to be limited only as indicated by the scope of the following claims.

What is claimed is:

1. An automatic memory clock-actuating circuit for an asynchronous data processing system including a data memory, comprising asynchronous memory clock means for providing sequential timing pulses for controlling a memory read or memory write cycle in a data processing operation, means for actuating said clock means for a first memory cycle, means indicating a request for a memory read or memory write operation on the next cycle, means for deriving from said clock means prior to termination of said first cycle a control pulse, first means responsive to said control pulse and to said indicating means for addressing the memory for the next cycle of operation, and second means responsive to said indicating means and to said control pulse for actuating said clock means for the next cycle immediately after the termination of the first cycle, whereby the clock means operates continuously and without any lost time between memory cycles.

2. An automatic memory clock-actuating circuit as defined in claim 1 wherein said second means produces individual memory read and memory write pulses and said asynchronous clock means comprises a read delay line clock generator and a write delay line clock generator, said clock generators being energized by the respective read and write memory pulses to initiate the timing pulses for the next memory cycle.

3. An automatic memory clock-actuating circuit for an asynchronous data processing system including an asynchronous buffer memory for transferring data between a main memory and an input-output device comprising asynchronous clock means for generating a sequence of timing pulses for controlling a cycle of memory operation, means for requesting a buffer memory cycle of operation, means responsive to said requesting means for addressing said buffer memory prior to a memory cycle, means for generating an initial cycle start signal, circuit means responsive to said requesting means and said generating means to start said clock means for an initial memory cycle of operation, means for indicating a request for a memory operation on the next cycle, means for deriving from said clock means a feedback pulse prior to the end of each cycle, and means responsive to said feedback pulse and to said indicating means for producing buffer memory address control signals for the next memory cycle, said circuit means also being responsive to said indicating means, said requesting means and said feedback pulse to start said clock means for the next cycle immediately after the termination of the first cycle, whereby the clock means operates continuously and without any lost time between memory cycles.

4. An automatic memory clock-actuating circuit for an asynchronous data processing system including an asynchronous buffer memory for transferring data between a main memory and an input output device comprising an open ended read delay line clock generator for providing a sequence of read timing pulses for a buffer memory read cycle, an open ended write delay line clock generator for producing a sequence of write timing pulses for a buffer memory write cycle, means for selectively requesting a main memory operation with said buffer memory and an input-output operation with said buffer memory before the end of a current memory cycle, means for deriving a feed back pulse from an operating delay line clock generator prior to the end of a current memory cycle, first AND gate means responsive to said requesting means and to a feedback pulse for producing buffer address control signals for the next memory cycle, means for indicating a read or write operation for the next memory cycle, and second AND gate means responsive to said requesting means, said feedback pulse and said indicating means to start the corresponding delay line clock generator to produce a sequence of read timing pulses or write timing pulses, respectively immediately after the termination of the current cycle, whereby clock generator timing pulses are produced continuously and without any lost time between memory cycles.

References Cited by the Examiner

Richards, "Arithmetic Computations in Digital Computers," published by Nostrand, pages 339–341, 1955.

ROBERT C. BAILEY, *Primary Examiner.*

MALCOLM A. MORRISON, *Examiner.*

W. M. BECKER, *Assistant Examiner.*